(12) United States Patent
Li et al.

(10) Patent No.: US 10,833,622 B2
(45) Date of Patent: Nov. 10, 2020

(54) HYBRID TRANSMISSION WIRING VERIFICATION

(71) Applicant: Ford Global Technologies, LLC, Dearborn, MI (US)

(72) Inventors: Silong Li, Canton, MI (US); Wei Xu, Canton, MI (US); Jiyao Wang, Canton, MI (US); Yinghan Xu, San Jose, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 486 days.

(21) Appl. No.: 15/927,227

(22) Filed: Mar. 21, 2018

(65) Prior Publication Data

US 2019/0296679 A1    Sep. 26, 2019

(51) Int. Cl.
| | |
|---|---|
| *H02P 29/024* | (2016.01) |
| *H02P 6/18* | (2016.01) |
| *H02P 21/18* | (2016.01) |
| *B60W 20/15* | (2016.01) |
| *H02H 7/08* | (2006.01) |
| *B60W 20/50* | (2016.01) |
| *H02P 21/32* | (2016.01) |

(52) U.S. Cl.
CPC .......... *H02P 29/024* (2013.01); *B60W 20/15* (2016.01); *B60W 20/50* (2013.01); *H02H 7/0805* (2013.01); *H02P 6/18* (2013.01); *H02P 21/18* (2016.02); *H02P 21/32* (2016.02)

(58) Field of Classification Search
CPC ............. H02P 21/18; H02P 6/185; H02P 6/20
See application file for complete search history.

(56) References Cited

U.S. PATENT DOCUMENTS

| | | | | |
|---|---|---|---|---|
| 5,763,976 A | * | 6/1998 | Huard | .................... H02K 24/00 29/598 |
| 8,018,187 B2 | | 9/2011 | Schulz et al. | |
| 9,093,940 B2 | | 7/2015 | Xu et al. | |
| 2011/0221366 A1 | * | 9/2011 | Gallegos-Lopez | ..... H02P 21/36 318/400.02 |
| 2017/0257051 A1 | | 9/2017 | Kabeya et al. | |

* cited by examiner

*Primary Examiner* — Zoheb S Imtiaz
(74) *Attorney, Agent, or Firm* — David B Kelley; Brooks Kushman P.C.

(57) ABSTRACT

In an electrified vehicle having a synchronous traction motor, an inverter is connected to stator windings by three power cables. If these cables are accidentally connected to the wrong windings, the resulting torque will not match the desired torque, and may even be in the wrong direction. To avoid this problem, a test is performed any time that the cables may have been unplugged and re-connected. The inverter is commanded to generate a rotating magnetic field while the rotor is held stationary, resulting in a positive and a negative response current. A relationship between a phase angle of the negative response current and the rotor position indicates which cables are connected to which windings. If the cables are incorrectly connected, the controller disables the motor and informs an operator which cables to swap to achieve correct connection.

17 Claims, 7 Drawing Sheets

US 10,833,622 B2

HYBRID TRANSMISSION WIRING VERIFICATION

TECHNICAL FIELD

This disclosure related to the field of hybrid electric vehicles. More particularly, the disclosure relates to a method of verifying that electrical connections are correct.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

In order to reduce fuel consumption, some vehicles include electrified powertrains. Electrified powertrains include battery electric vehicles which operate entirely on stored electrical power, and hybrid powertrains which utilize energy storage to supplement the power produced by the internal combustion engine. Hybrid powertrains also enable the capture and later use of energy that would otherwise be dissipated by the braking system. Some hybrid powertrains, called plug-in hybrid powertrains, permit charging of the battery from grid power while the vehicle is parked.

SUMMARY

An electrified vehicle includes a synchronous motor, an inverter, and a controller. The motor includes a stator and a rotor. The inverter is connected to three stator windings by three cables. The controller is programmed to disable the motor if the cables are incorrectly connected. Specifically, the controller is programmed to command the inverter to establish a rotating magnetic field in the motor while the rotor is stationary and to selectively preclude motive operation based on a current response and a position of the rotor. A ratio of an inverter switching frequency and a frequency of the rotating magnetic field may be between 10 and 20. The controller may calculate a phase angle of a negative response current using a discrete Fourier transform based on samples of the current response. Correct connection would be indicated by the phase angle of the response current being twice the rotor position minus pi/2. Incorrect connection is inferred when the phase angle of the negative response current differs from this value by more than a threshold. The controller may indicate to an operator which of the three cables should be swapped to establish correct connection. The controller may also inform the user if the current response is consistent with correct connection but also consistent with a possible incorrect connection. The controller may also command the inverter to establish two voltage pulses into the cables while the rotor is stationary, the pulses being equal in magnitude and opposite in phase angle, and disable vehicle operation in response to a resulting direct current component being inconsistent with correct connection of a resolver.

A method of detecting incorrect connection of power cables between an inverter and a synchronous motor includes holding a rotor stationary, measuring a rotor position, commanding the inverter to vary voltages of the cables to establish a rotating magnetic field in the motor, measuring a response current, and reporting incorrect connection in response to a relationship between a phase angle of a negative response current and the rotor position. Specifically, incorrect connection may be reported when an absolute value of a difference between the phase angle of the negative response current and twice the rotor position minus pi/2 exceeds a threshold.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
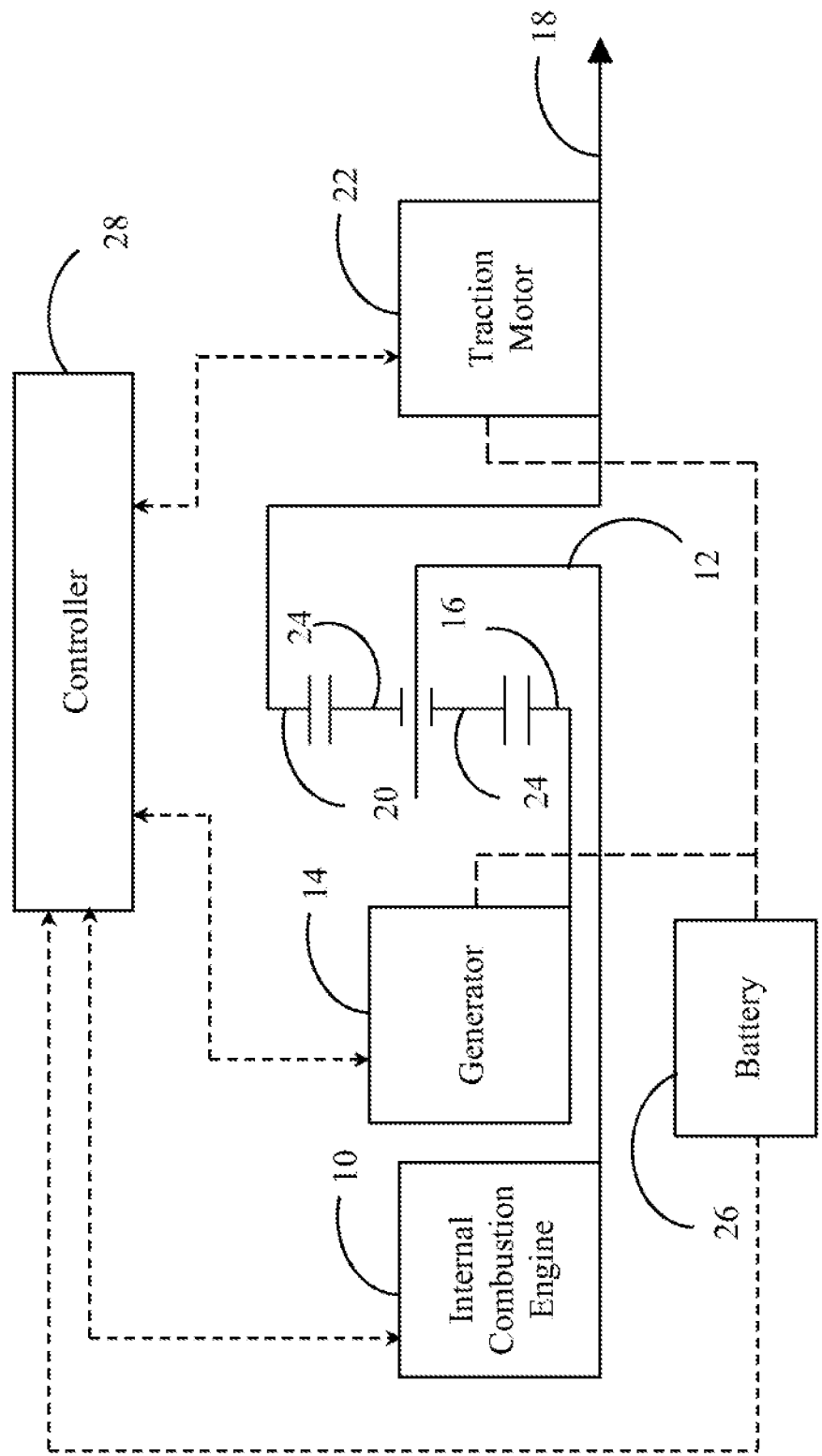
FIG. 1 is a schematic diagram a hybrid vehicle powertrain.

FIG. 1 is a cross section of a power-split hybrid powertrain. Mechanical connections are indicated by solid lines. Electrical power connections are indicated by dashed lines. Signal flows are indicated by dotted lines. Mechanical power is supplied by internal combustion engine 10. The crankshaft of engine 10 is fixedly coupled to the carrier 12 of a simple planetary gear set. The rotor of a first electric machine 14 is fixedly coupled to the sun gear 16 of the planetary gear set. Output shaft 18 is driveably connected to the ring gear 20 of the planetary gear set. Power is transmitted from output shaft 18 to a differential which directs mechanical power to driving wheels. The rotor of a second electric machine 24 is driveably connected to output shaft 18. Although motor 24 and output shaft 18 are shown fixedly coupled to one another and to ring gear 20 in FIG. 1, intermediate gearing may be present in some embodiments. A set of planet gears 24 are supported for rotation with respect to carrier 12 and mesh with sun gear 16 and ring gear 20. Electric machines 14 and 22 are both reversible electric machines capable of converting electrical power to mechanical power and converting mechanical power to electrical power. The first electric machine may be called the generator and the second electric machine may be called the traction motor. These terms are simply labels related to the most common function of the electric machine. Both electrical machines store electrical power in and/or receive electrical power from battery 26. Controller 28 sends signals to engine 10 and electric machines 14 and 22 to regulate the torque produced by each component. Controller also receives signals from these components, from battery 26, and from other components not shown in FIG. 1.

Figure 2:
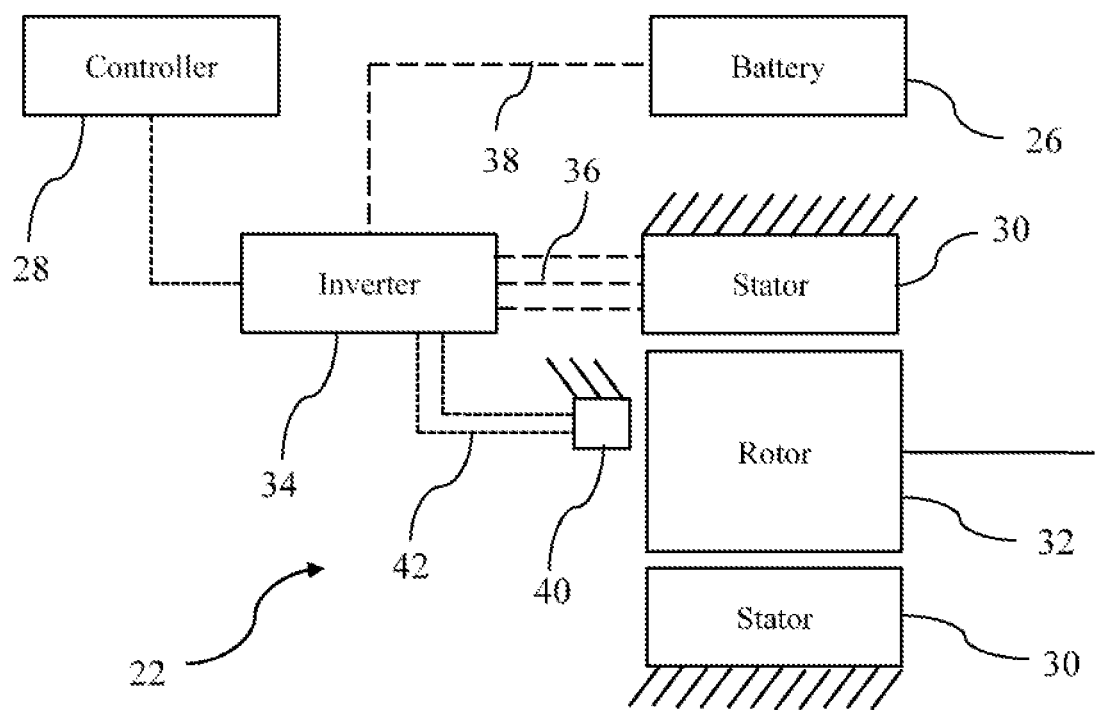
FIG. 2 is a schematic diagram of a synchronous motor and inverter suitable for use in the hybrid vehicle powertrain of FIG. 1.

FIG. 2 shows the structure of traction motor 22 in more detail. Motor 22 is a three-phase synchronous electric motor. Generator 14 is similarly structured. Stator 30 is fixed to the transmission case. Rotor 32 is supported for rotation relative to stator 30. A small air gap separates stator 30 and rotor 32 radially. Stator 30 includes three phase windings. These are connected to inverter 34 by three power cables 36. Inverter 34 is connected to battery 26 by DC bus 38. Inverter 34 establishes voltages across the windings by electrically connecting the cables to either the positive terminal of the DC bus, the negative terminal of the DC bus, or neither. To establish voltage levels less than the DC bus voltage, the inverter makes these connections intermittently and controls the voltage by varying the percentage of time that the respective DC terminal is connected. This is called Pulse Width Modulation (PWM). The frequency at which the terminals are connected and disconnected during PWM operation is called the switching frequency.

The voltage across the stator windings results in a current through the stator windings, which creates a magnetic field in the motor. The rotor includes permanent magnets that are attracted or repulsed by the magnetic field. These magnetic forces result in mechanical torque on the rotor. The magnitude of the torque depends upon the magnitude of the current and also on the orientation of the magnetic field relative to the position of the rotor. Rotation of the rotor also induces current in the stator windings. In order to achieve a desired torque, the current through the windings must change as the rotor rotates. To accomplish that, the voltage across the windings must vary as the rotor rotates. The controller may specify the voltage relative to the rotor. In other words, the voltage is specified in a rotating reference frame. Commonly, the voltage command is specified in a rotating Cartesian reference frame by d and q components, $V_d^r$ and $V_q^r$. To convert $V_d^r$ and $V_q^r$ to voltages on the three power cables 36, inverter 34 must know the position of the rotor. Inverter 34 determines the position of the rotor using resolver 40 which is connected to connected to inverter 34 by signal bus 42. Inverter 36 also measures the current through the windings, converts the values to the rotating reference frame, and reports the d and q components, $I_d^r$ and $I_q^r$, to controller 28. For the most accurate torque control, controller 28 may adjust $V_d^r$ and $V_q^r$ in a closed loop fashion to achieve a desired $I_d^r$ and $I_q^r$.

For a motor with two poles, the voltage and current will go through one complete cycle for every physical rotation of the rotor during steady state operation. However, many motors have more than two poles. For a motor with N poles, the voltage and current will go through N/2 cycles per physical revolution of the rotor. For control of the motor electronics, the position of the rotor relative to the poles, called the electrical position, is the significant criteria. Throughout this document, any discussion of rotor position or velocity refers to electrical position unless otherwise specified.

The motor, resolver, and inverter are manufactured separately, so the power cables 36 and the resolver signal bus 42 must be connected after the components are assembled into the transmission. Servicing or repair of the hybrid transmission may require disconnecting and reconnecting this wiring. It may be possible for the resolver signal bus 42 to be installed with reverse polarity. If that occurs, the inverter may mis-calculate the rotor position, resulting in improper translation of the controller commands into phase voltages and improper translation of phase currents into Cartesian coordinates. Also, the power cables may be swapped with one another. If that occurs, motor torque may have unexpected magnitude or even direction. For these reasons, it is desirable to verify that the connections have been made properly following assembly or re-assembly of the transmission.

Figure 3:
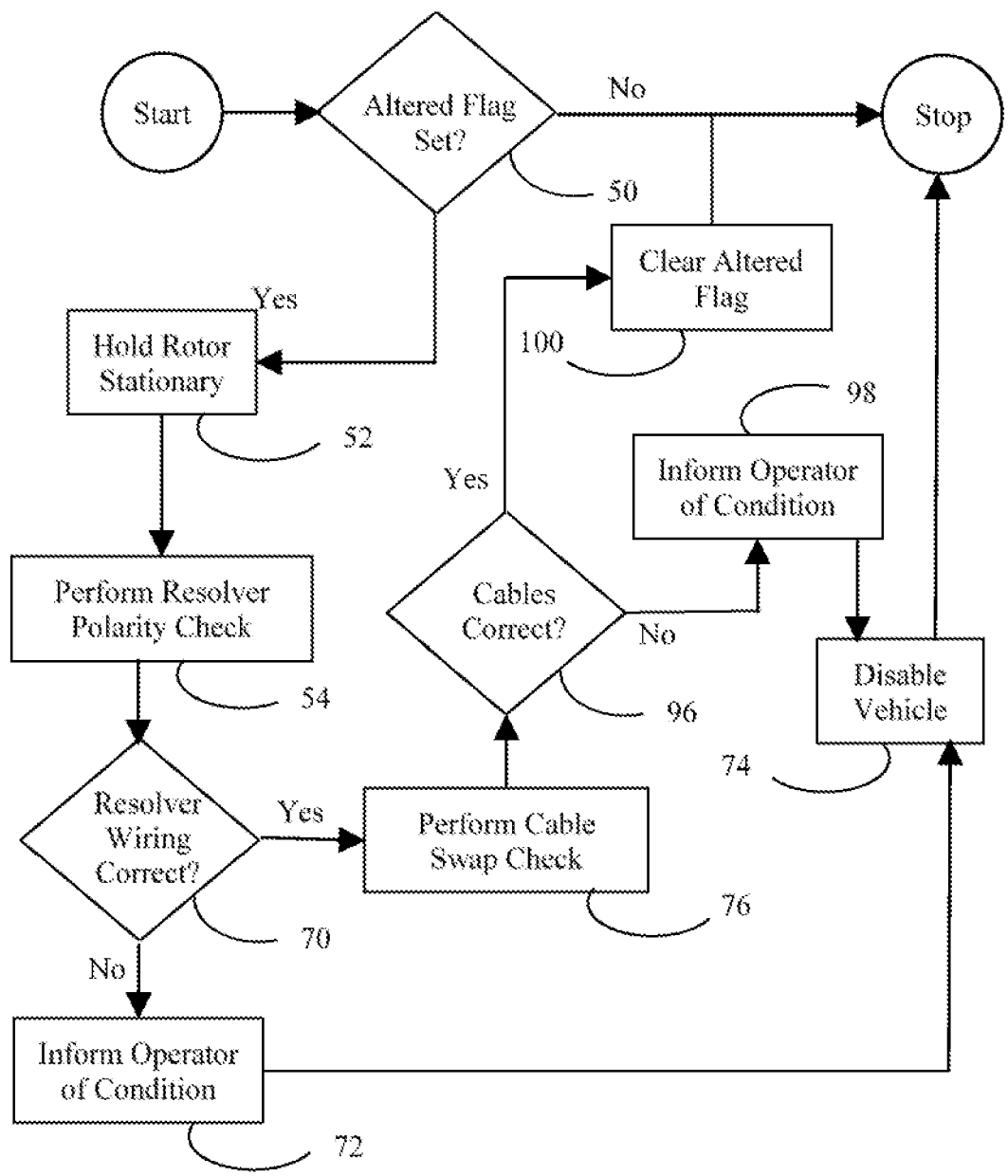
FIG. 3 is a flowchart illustrating a method of verifying correct electrical connections between the motor and inverter of FIG. 2

FIG. 3 illustrates a process for automatically checking for correct wiring. At 50, the controller checks whether the wiring has been potentially altered by checking the status of a flag. The flag may be set upon entering a dealer mode that is executed following any service process. Alternatively, the controller may sense a disconnected state and set the flag automatically. If the flag is not set at 50, implying that the wiring has been continuously connected, the process ends. At 52, the controller ensures that the rotor is held stationary. In the power-split hybrid configuration of FIG. 1, both motors would be stationary as long as the vehicle is in Park and the engine is not running. At 54, the controller conducts a resolver polarity check, as detailed further in FIG. 4.

Figure 4:
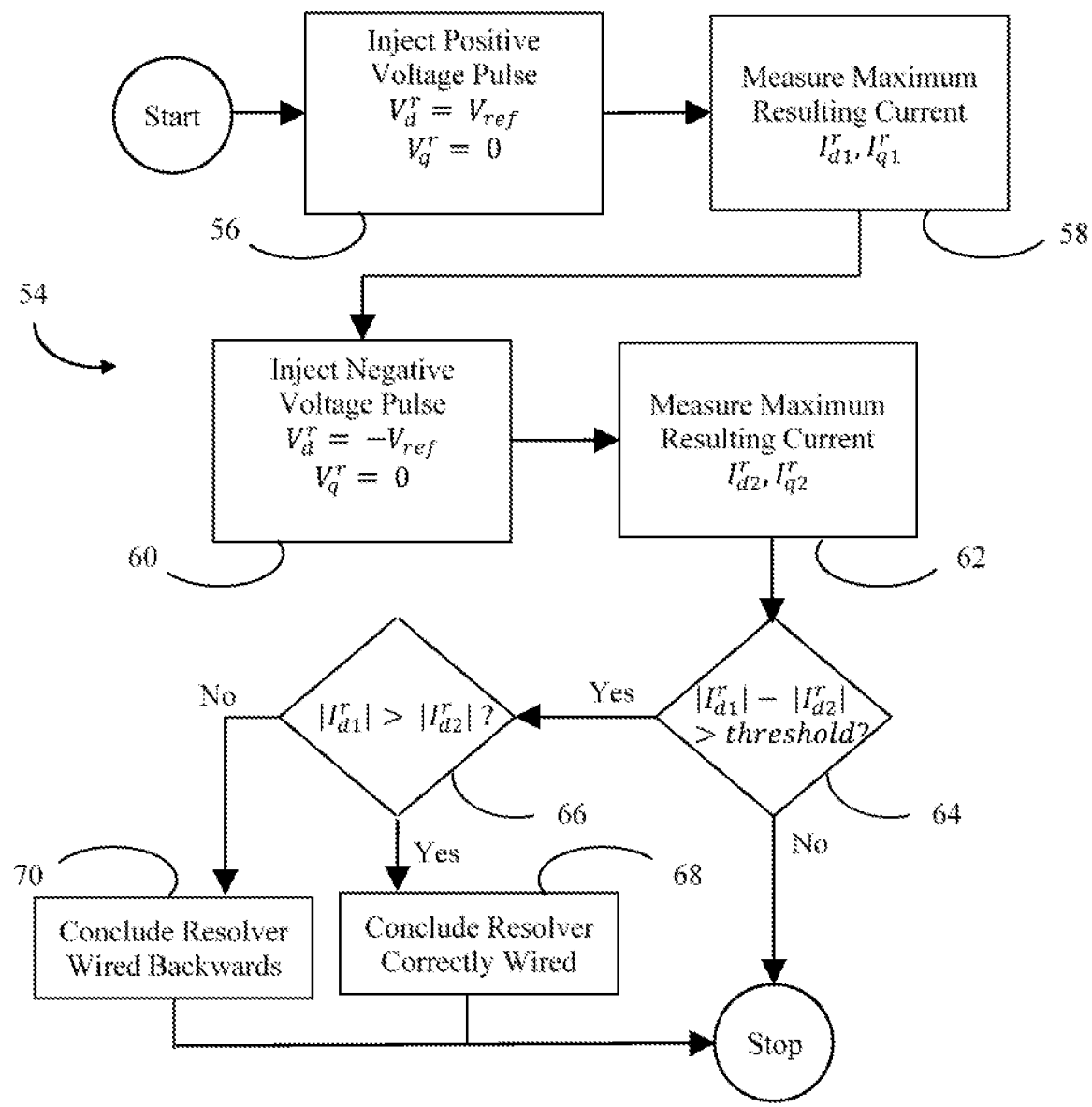
FIG. 4 is a flowchart detailing the resolver polarity check in the process of FIG. 3.
Figure 5:
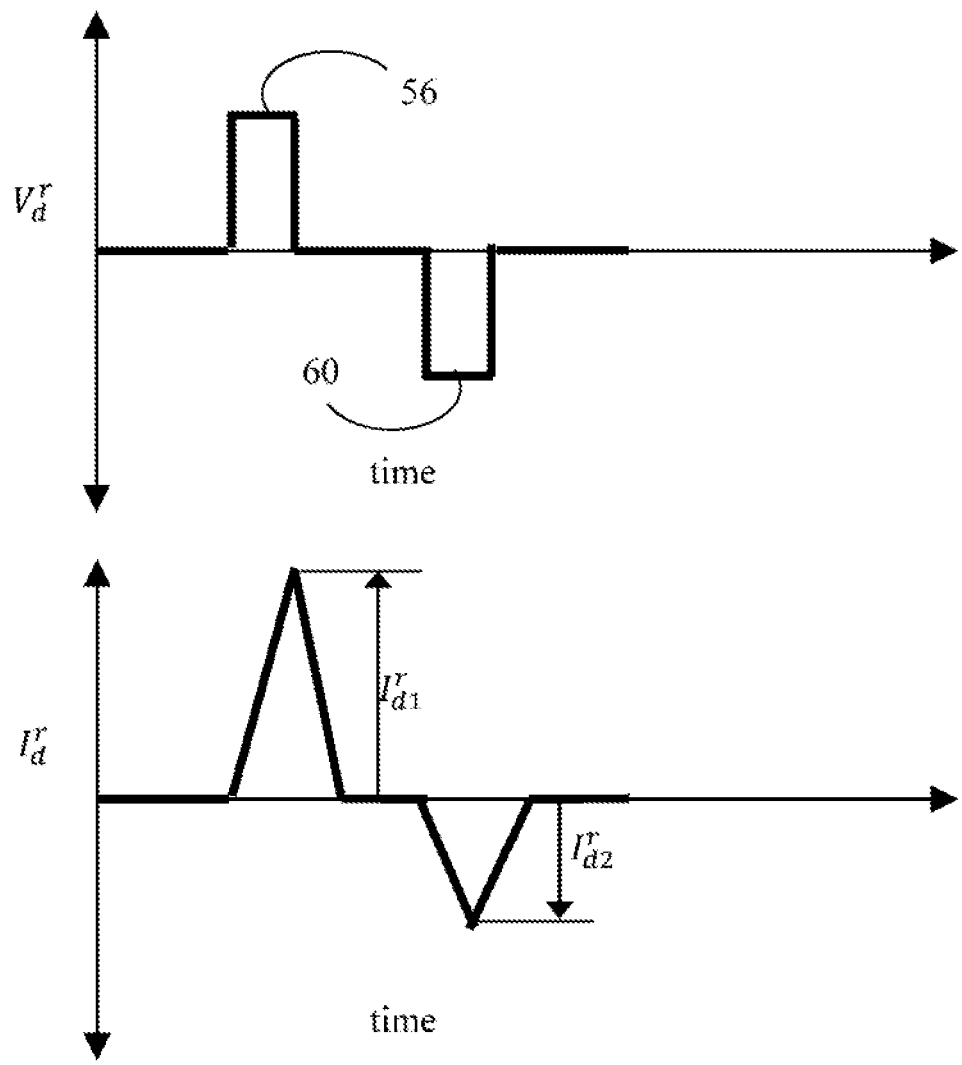
FIG. 5 is a graph indicating a relationship between voltage and current during the process of FIG. 4.

Referring now to FIG. 4, the controller commands a positive voltage pulse by setting $V_d^r$ to a reference voltage and $V_q^r$ to zero for a predetermined, relatively short duration. The positive voltage pulse results in a positive current pulse. At 56, the controller notes the peak resulting $I_d^r$ and $I_q^r$ components of the positive current pulse, and stores these values as $I_{d1}^r$ and $I_{q1}^r$ respectively. Similarly, at 60, the controller commands a negative voltage pulse by setting $V_d^r$ to a negative value with the same magnitude as the reference voltage and $V_q^r$ to zero for the same predetermined duration. At 62, the controller stores the peak $I_d^r$ and $I_q^r$ components of the resulting current spike as $I_{d2}^r$ and $I_{q2}^r$ respectively. Due to the characteristics of permanent magnet synchronous motors, $I_{d1}^r$ should be larger in magnitude than $I_{d2}^r$. The controller checks at 64 whether the magnitudes differ by at least a threshold amount. If not, the check ends without reaching a definitive conclusion as to whether or not the resolver polarity is correct. If there is separation in magnitude at 64, the controller proceeds to 66. If the peak d component of the positive current pulse, $I_{d1}^r$, is larger in magnitude than the peak d component of the negative current pulse, $I_{d2}^r$, then the controller concludes at 68 that the resolver is wired correctly. Otherwise, the controller concludes at 70 that the resolver is wired with opposite polarity. The response for correct wiring is illustrated in FIG. 5.

Returning now to FIG. 3, if the polarity check failed to conclude that the resolver polarity is correct, as determined at 70, then the controller informs the operator of the result at 72. The operator may be informed, for example, by setting a failure code readable by service personnel, by a displayed message, or by an audio message. When the polarity check concludes that the resolver is wired backwards, the message may indicate what steps the operator should perform to remedy the problem, such as disconnecting the resolver and reconnecting it with opposite polarity. When the polarity check is inconclusive, the message may indicate that the operator should repeat the procedure and may suggest actions that increase the likelihood of obtaining a conclusive result. At 74, the vehicle is disabled such that normal operation is not permitted until correct wiring can be confirmed. Some limited operation may be enabled to facilitate re-check. For example, if only one of the electric machines in the power-split hybrid of FIG. 1 fails the verification, operations that utilize only the other electric machine and the engine may be permitted. If the controller concludes that the resolver polarity is correct, the controller proceeds to perform a cable swap check at 76, as detailed further in FIG. 6.

Figure 6:
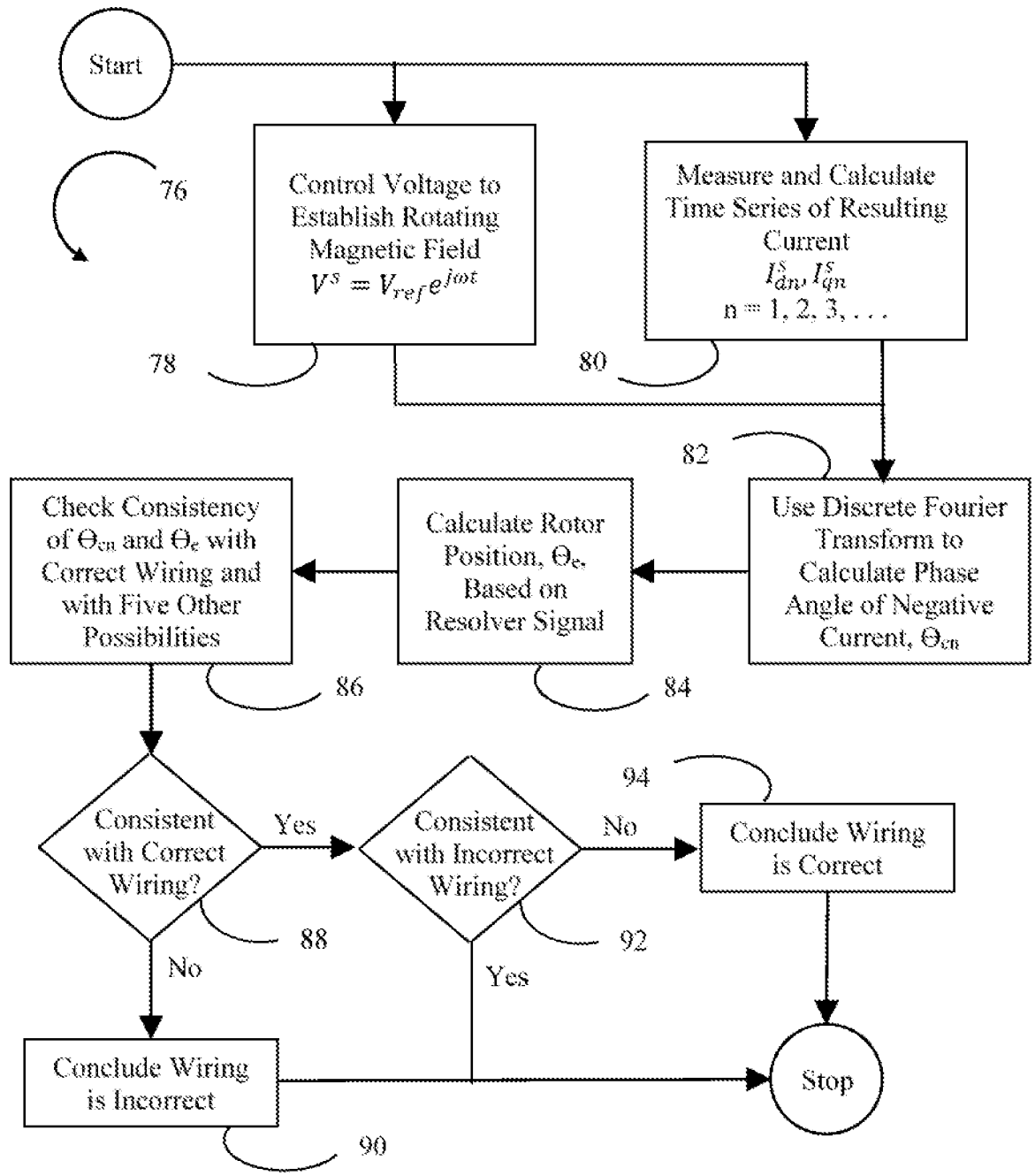
FIG. 6 is a flowchart detailing the cable swap check in the process of FIG. 3.
Figure 7:
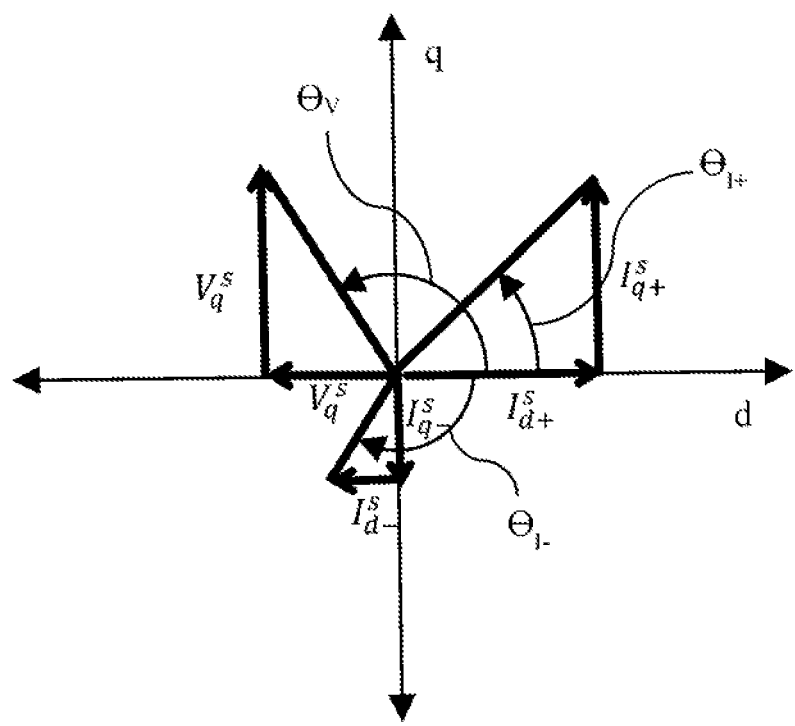
FIG. 7 is a diagram indicating a relationship between voltage and current during the process of FIG. 6.

Referring now to FIG. 6, at 78, the controller commands a voltage that rotates in a stationary reference frame. The $V_d^s$ and $V_q^s$ components are both sinusoidal. The frequency, $\omega$, of the commanded voltage is preferably between $\frac{1}{20}^{th}$ and $\frac{1}{10}^{th}$ of the switching frequency. At regular intervals while the rotating voltage is being commanded, the controller records values of the $I_d^s$ and $I_q^s$ current components, such that the controller obtains a time series of these components. FIG. 7 is a illustrates the current that results from a rotating voltage with the rotor stationary. Specifically, the resulting current includes two superimposed response currents, one which rotates in the same direction as the voltage and one that rotates in the opposite direction of the voltage. The one that rotates in the same direction as the voltage is called the positive sequence current response and is represented in FIG. 7 by the components $I_{d+}^s$ and $I_{q+}^s$. The one that rotates in the opposite direction as the voltage is called the negative sequence current response and is represented in FIG. 7 by the components $I_{d-}^s$ and $I_{q-}^s$. FIG. 7 illustrates the voltages and response currents at a particular instance in time. Over time, the voltage and the positive response current rotate counter-clockwise while the negative response current rotates clockwise. Mathematically, the response current as a function of time follows the equation:

$$I^s = I_{cp} e^{j(\omega t + \theta_{cp})} + I_{cn} e^{j(-\omega t + \theta_{cn})}$$

At 82, a discrete Fourier transform is used to calculate the magnitudes, $I_{cp}$ and $I_{cn}$, and the phase angles, $\theta_{cp}$ and $\theta_{cm}$, of the positive and negative sequence current response, respectively, from the time series of measured currents. At 84, the rotor position, $\theta_e$, is determined based on signals from the resolver. Table 1 below indicates a relationship between the rotor position, $\theta_e$, and the phase angle of the negative sequence current response, $\theta_{cn}$. The relationship varies depending on how the power cables are connected. The actual connection is indicated by a three letter sequence wherein abc indicates correct connection, bac represents reversal of the a and b cables, acb represents reversal of the b and c cables, and so on. Six different actual connection possibilities exist, assuming each cable is plugged into a socket.

TABLE 1

| Actual Connection | Theoretical Relationship | Consistency Criteria |
|---|---|---|
| abc - correct | $\theta_{cn} = 2\theta_e - \frac{\pi}{2}$ | $\left|2\theta_e - \frac{\pi}{2} - \theta_{cn}\right| < $ threshold |
| acb | $\theta_{cn} = -2\theta_e - \frac{\pi}{2}$ | $\left|-2\theta_e - \frac{\pi}{2} - \theta_{cn}\right| < $ threshold |
| bca | $\theta_{cn} = 2\left(\theta_e - \frac{2\pi}{3}\right) - \frac{\pi}{2}$ | $\left|2\left(\theta_e - \frac{2\pi}{3}\right) - \frac{\pi}{2} - \theta_{cn}\right| < $ threshold |
| bac | $\theta_{cn} = -2\left(\theta_e - \frac{2\pi}{3}\right) - \frac{\pi}{2}$ | $\left|-2\left(\theta_e - \frac{2\pi}{3}\right) - \frac{\pi}{2} - \theta_{cn}\right| < $ threshold |
| cab | $\theta_{cn} = 2\left(\theta_e + \frac{2\pi}{3}\right) - \frac{\pi}{2}$ | $\left|2\left(\theta_e + \frac{2\pi}{3}\right) - \frac{\pi}{2} - \theta_{cn}\right| < $ threshold |

TABLE 1-continued

| Actual Connection | Theoretical Relationship | Consistency Criteria |
|---|---|---|
| cba | $\theta_{cn} = -2\left(\theta_e + \frac{2\pi}{3}\right) - \frac{\pi}{2}$ | $\left|-2\left(\theta_e + \frac{2\pi}{3}\right) - \frac{\pi}{2} - \theta_{cn}\right| < $ threshold |

At 86, the controller tests the checks whether the calculated $\theta_e$ and $\theta_{cn}$ values are consistent with the relationships in Table 1. Note that there are some combinations of $\theta_e$ and $\theta_{cn}$ that are consistent with more than one arrangement of power cables. Specifically, when $\theta_e$ is a multiple of $2\pi/6$, the combination will likely satisfy two of the consistency criteria. If the values fail to satisfy the consistency criteria for correct wiring at 88, then the controller concludes at 90 that the wiring is incorrect. If the values satisfy the consistency criteria for correct wiring at 88, and fail to satisfy the consistency criteria for any of the five incorrect possibilities at 92, then the controller concludes at 94 that the power cables are connected correctly. If the values satisfy the consistency criteria for correct wiring at 88, and also satisfy the consistency criteria for one or more of the five incorrect possibilities at 92, then no conclusion is reached regarding whether the power cables are connected correctly.

Returning now to FIG. 3, if the cable swap check failed to conclude that the power cables are wired correctly, as determined at 96, then the controller informs the operator of the result at 98. Potential methods of informing the operator are the same as at 72. When the cable swap check concludes that the resolver is wired incorrectly, the message may indicate which cables the operator should reverse to remedy the problem based on which consistency criteria for incorrect wiring were satisfied. When the cable swap check is inconclusive, the message may indicate that the operator should repeat the procedure and may suggest repositioning the rotor and retesting. At 74, the vehicle is disabled as discussed previously. If the controller concludes that power cables are connected correctly, the controller clears the flag to prevent the routine from being re-executed until the flag is set again.

Unlike other known methods of detecting mis-connection of the three power cables, the methods proposed above do not require rotation of the rotor and may be performed with voltages and currents of less magnitude. The vibrations that may be induced by these known methods is thereby avoided. Furthermore, the known methods do not determine which cables must be swapped to remedy the mis-connection.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electrified vehicle comprising:
   a synchronous motor having a stator and a rotor;
   an inverter connected to three stator windings by three cables; and
   a controller programmed to
      command the inverter to establish a rotating magnetic field in the motor while the rotor is stationary,
      measure a rotor position using a resolver,
      sample a current response, calculate a phase angle of a negative response current using a discrete Fourier transform, and selectively preclude motive motor operation based on the current response on the cables and the position of the rotor, wherein the current response comprises an absolute value of a difference between the phase angle of the negative response current and twice the rotor position minus pi/2 being greater than a threshold.

2. The electrified vehicle of claim 1 wherein a ratio of an inverter switching frequency and a frequency of the rotating magnetic field is between 10 and 20.

3. The electrified vehicle of claim 1 wherein the controller is further programmed to indicate to an operator which of the three cables should be swapped to establish correct connection.

4. The electrified vehicle of claim 1 wherein the controller is further programmed to inform an operator when the current response is consistent with both correct connection and an incorrect connection.

5. The electrified vehicle of claim 1 wherein the controller is further programmed to
command the inverter to establish two voltage pulses into the cables while the rotor is stationary, the pulses being equal in magnitude and opposite in phase angle, and
disable vehicle operation in response to a resulting direct current component being inconsistent with correct connection of a resolver.

6. The electrified vehicle of claim 1 further comprising a planetary gearset having a first component driveably coupled to an output shaft and to the rotor, a second component driveably connected to an internal combustion engine, and a third component driveably connected to a second electric machine.

7. The electrified vehicle of claim 1 further comprising a planetary gearset having a first component driveably coupled to an output shaft and to a second electric machine, a second component driveably connected to an internal combustion engine, and a third component driveably connected to the rotor.

8. A method of detecting incorrect connection of power cables between an inverter and a synchronous motor comprising:
holding a rotor stationary;
measuring a rotor position;
commanding the inverter to vary voltages of the cables to establish a rotating magnetic field in the motor;
measuring a response current; and
reporting incorrect connection in response to a relationship between a phase angle of a negative response current and the rotor position, wherein the relationship between the phase angle of the negative response current and the rotor position comprises an absolute value of a difference between the phase angle of the negative response current and twice the rotor position minus pi/2 being greater than a threshold.

9. The method of claim 8 wherein a ratio of an inverter switching frequency and a frequency of the rotating magnetic field is between 10 and 20.

10. The method of claim 8 further comprising reporting which of the power cables should be swapped to establish correct connection.

11. The method of claim 8 further comprising:
commanding the inverter to establish two voltage pulses into the cables while the rotor is stationary, the pulses being equal in magnitude and opposite in phase angle, and
reporting incorrect connection of the resolver in response to a resulting direct current component being inconsistent with correct connection of a resolver.

12. The method of claim 8 wherein the synchronous motor and inverter are installed in a vehicle and the method is performed by a controller also installed in the vehicle.

13. An electrified vehicle comprising:
a synchronous motor having a stator and a rotor;
a resolver configured to measure a position of the rotor;
an inverter connected to three stator windings by three cables; and
a controller programmed to
command the inverter to vary voltages of the cables to establish a rotating magnetic field in the motor while the rotor is stationary,
calculate a phase angle of a negative response current, and
disable vehicle operation in response to an absolute value of a difference between the phase angle and twice the rotor position minus pi/2 being greater than a threshold.

14. The electrified vehicle of claim 13 wherein the controller is further programmed to indicate to an operator which of the three cables should be swapped to establish correct connection.

15. The electrified vehicle of claim 13 wherein the controller is further programmed to
command the inverter to establish two voltage pulses into the cables while the rotor is stationary, the pulses being equal in magnitude and opposite in phase angle, and
disable vehicle operation in response to a resulting direct current component being inconsistent with correct connection of the resolver.

16. The electrified vehicle of claim 13 further comprising a planetary gearset having a first component driveably coupled to an output shaft and to the rotor, a second component driveably connected to an internal combustion engine, and a third component driveably connected to a second electric machine.

17. The electrified vehicle of claim 13 further comprising a planetary gearset having a first component driveably coupled to an output shaft and to a second electric machine, a second component driveably connected to an internal combustion engine, and a third component driveably connected to the rotor.

* * * * *